United States Patent [19]
Anderson

[11] Patent Number: 6,145,285
[45] Date of Patent: Nov. 14, 2000

[54] APPARATUS AND METHOD FOR MOLDING A CONTAINER AND INCLUDING A VIBRATING KNIFE ASSEMBLY

[75] Inventor: Paul A. Anderson, Arlington Heights, Ill.

[73] Assignee: Weiler Engineering, Inc., Arlington Heights, Ill.

[21] Appl. No.: 09/162,658

[22] Filed: Sep. 28, 1998

[51] Int. Cl.[7] ................................................ B65B 47/00
[52] U.S. Cl. ........................ 53/561; 53/DIG. 2; 156/73.1; 156/580.1
[58] Field of Search ........................ 83/956; 156/580.1, 156/73.1, 580.2; 53/561, DIG. 2, 492, 558; 264/524, 525

[56] References Cited

U.S. PATENT DOCUMENTS

| | | |
|---|---|---|
| 4,188,952 | 2/1980 | Loshilov et al. .......................... 83/956 |
| 4,585,152 | 4/1986 | Sager ........................................ 83/956 |
| 4,707,966 | 11/1987 | Weiler et al. ............................. 53/558 |
| 4,925,515 | 5/1990 | Yoshimura et al. ...................... 83/956 |
| 5,007,315 | 4/1991 | Alexander et al. ......................... 83/72 |
| 5,168,787 | 12/1992 | Blaimschein .............................. 83/956 |
| 5,437,215 | 8/1995 | Hamilton .................................. 83/956 |
| 5,862,728 | 1/1999 | Giamello .................................. 83/956 |

*Primary Examiner*—Eugene Kim
*Attorney, Agent, or Firm*—Olson & Hierl, Ltd.

[57] ABSTRACT

An apparatus and method for molding and optionally filling a container including an extruder head for extruding a length of parison and a vibrating knife operatively associated with the apparatus for reciprocating movement and having a blade positioned below the extruder head which traverses the path of the extruded parison to sever the parison. Preferably, the vibrating knife vibrates the blade at ultrasonic frequencies.

10 Claims, 5 Drawing Sheets

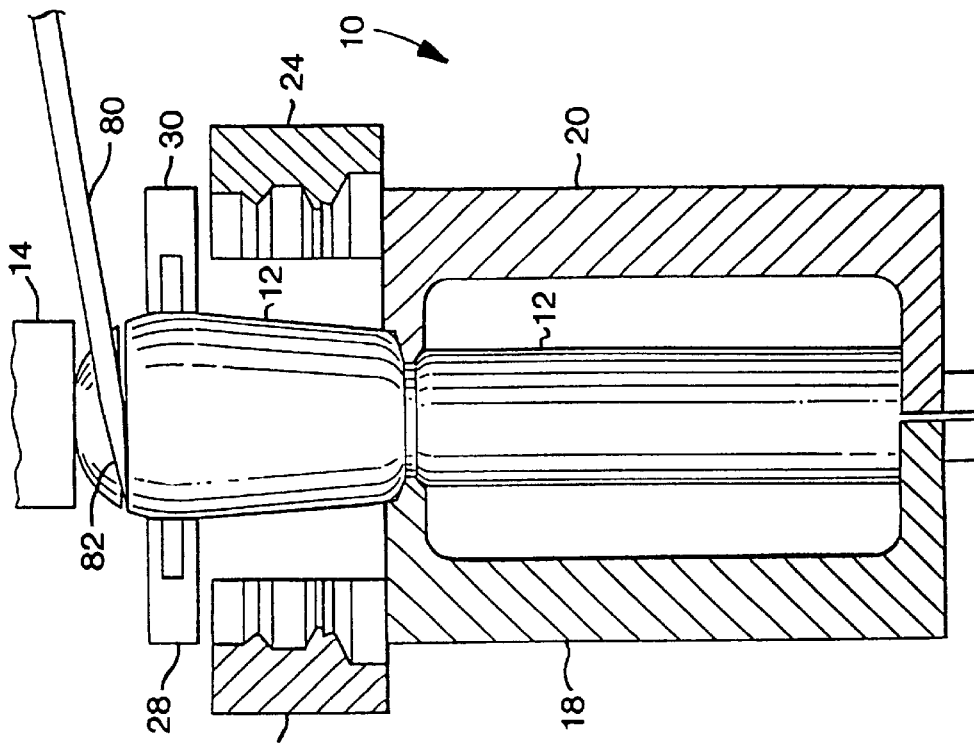
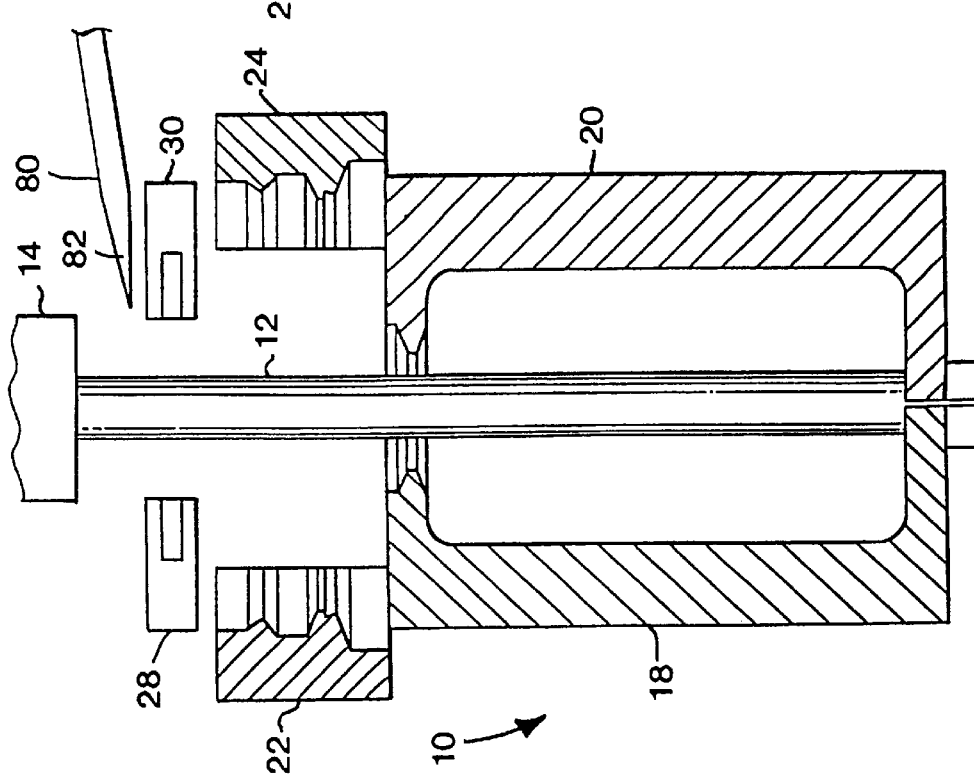

APPARATUS AND METHOD FOR MOLDING A CONTAINER AND INCLUDING A VIBRATING KNIFE ASSEMBLY

FIELD OF THE INVENTION

This invention relates to an apparatus and method for molding a container and, more particularly, to an improved apparatus and method for blow molding and filling a container which utilizes a vibrating knife to sever the extruded parison.

BACKGROUND OF THE INVENTION

Various patents disclose apparatus and methods for blow molding hollow thermoplastic containers. See, for example, U.S. Pat. No. 4,707,966 to Weiler et al. which discloses the continuous extrusion through an extruder head of a length of parison in the form of a hollow tube between and through two coacting first or main mold halves. The method includes the step of cutting off the parison below the extruder head and above the main mold halves to create an opening which allows a blowing and filling nozzle assembly to be moved downwardly into the opening in the parison for molding and thereafter filling a molded container.

When the container is filled with the desired amount of liquid, the blowing and filling nozzle assembly is retracted from the opening in the parison. A separate pair of coacting second or upper sealing mold halves are then moved together around the exposed length of parison to form and seal the container upper portion. The finished container, completely formed, filled, and sealed, is then conveyed out of the apparatus.

Of particular interest to the subject of the present invention is the apparatus and method for cutting off the length of parison and creating the opening therein which, according to the method disclosed in U.S. Pat. No. 4,707,966 to Weiler et al., currently involves the use of a heated moving cutter such as a hot wire or the like which melts through and severs the parison.

While this severing apparatus and method has worked satisfactorily in most applications, a potential disadvantage associated with the use of a hot wire or the like is the risk inherent in the generation or creation of parison particulates or vapor and the deposit thereof within the interior of the container or in the surroundings.

The present invention provides an improved apparatus and method for severing the parison which greatly reduces the generation or creation of contaminant particulates.

SUMMARY OF THE INVENTION

The present invention contemplates an improvement in an apparatus and method for molding a container from an extruded length of parison which has an extruder with at least one extruder head from which the length of parison is extruded, and a mold assembly for closing around the extruded length of parison to mold the container. A filling device for filling the container is optional.

The improvement of the present invention comprises a vibrating knife mounted for movement adjacent to the extruder head and having a blade positioned below the extruder head so as to traverse the path of extruded parison when the vibrating knife is moved to sever the extruded length of parison. Preferably, the vibrating knife is an ultrasonic knife.

The improved apparatus of the present invention also comprises a carriage assembly for the vibrating knife including a support bracket mounted to the apparatus, an actuator assembly mounted to the bracket including an actuator and a slide movable longitudinally relative to the actuator, and a hanger bracket mounted to the actuator slide.

The vibrating knife is mounted to the hanger bracket for reciprocating movement in response to the longitudinal movement of the actuator slide relative to the actuator between a retracted position and an extended position where the blade of the vibrating knife traverses the path of the extruded parison.

In a preferred embodiment, the vibrating knife is an ultrasonic knife. The ultrasonic knife includes a booster and an ultrasonic generator and the carriage assembly further includes spaced apart clamps which surround the booster and the ultrasonic generator respectively and are secured to the hanger bracket. The clamps are positioned at the nodal points of the booster and the ultrasonic genarator respectively to minimize any damping of the vibrations to the knife.

Because the use of a vibrating knife eliminates the need for a wire maintained at a high temperature, the generation of parison particulates during the severing operation, and thus the risk of contamination of the container contents as well as the surrounding environment, is minimized.

In another embodiment, the apparatus includes an anvil mounted opposite the vibrating knife and on the opposite side of the length of extruded parison for reciprocating movement into abutting contact with the extruded length of parison when the blade of the vibrating knife traverses the extruded length of parison in contact with the anvil.

In some applications, the extruder head is mountable for upward movement relative to the mold assembly for stretching the extruded tubular length of parison prior to moving the anvil into contact therewith.

In yet another embodiment of the invention, the anvil can be substituted with a second knife opposite the first knife and on the opposite side of the extruded length of parison. The second knife, like the first knife, is mounted for reciprocating movement adjacent the extruder head and has a blade positioned opposite from and offset relative to the blade of the first vibrating knife so as to traverse and sever the extruded length of parison.

In a further embodiment, jaws are mounted between the extruder head and the vibrating knife and on opposite sides of the extruded length of parison for holding the parison segment to be molded.

The use of an anvil, a second knife and/or support jaws are particularly advantageous in applications where the vibrating knife is used to sever parison made of elastomeric material.

According to the invention, the anvil acts as a backing or support plate which prevents the stretching or buckling of the parison during the severing operation while the support jaws hold the parison in a taut, non-buckling orientation during the severing operation.

Other features and advantages of the present invention will become readily apparent from the following detailed description, the appended drawings, and the accompanying claims.

BRIEF DESCRIPTION OF THE DRAWINGS

In the drawings,

FIG. 1 is a simplified, partly fragmentary sectional view of an apparatus for molding a container depicting a vibrating knife blade of the present invention in its retracted position;

FIG. 2 is a simplified, partly fragmentary sectional view similar to FIG. 1 depicting the vibrating knife blade in its extended parison severing position;

DETAILED DESCRIPTION OF THE PREFERRED EMBODIMENTS

Figure 3:
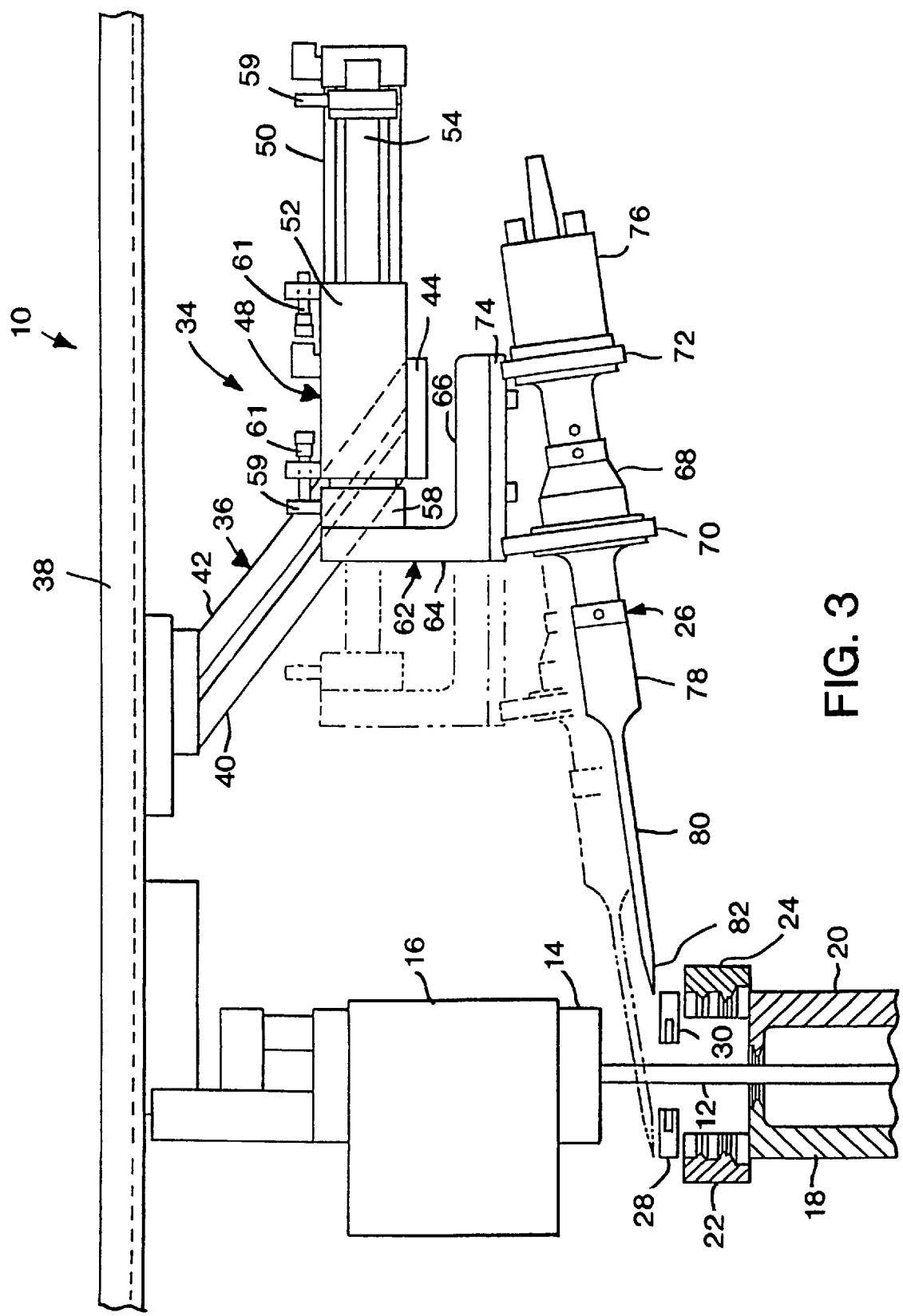
FIG. 3 is a partly simplified fragmentary elevational view of the apparatus for molding a container depicting a vibrating knife and the carriage assembly therefor in both its retracted position and its extended position (in phantom)

This invention may be used in many different forms. The specification and the accompanying drawings disclose only exemplary embodiments of the present invention. The invention is not to be limited to the embodiments illustrated and the scope of the invention will be pointed out in the appended claims.

The precise shapes and sizes of the components herein described are not essential to the invention unless otherwise indicated.

For ease of description, the apparatus and method of this invention will be described in the normal (upright) operating position. Terms such as upper, lower, horizontal, etc., will be used in reference to this position. It will be understood, however, that the apparatus of this invention may be manufactured, stored, transported, used, and sold in an orientation other than the position described.

The apparatus and method of this invention incorporates many of the method steps and much of the apparatus disclosed in U.S. Pat. No. 4,707,966 to Weiler et al. The disclosures therein are incorporated herein by reference to the extent that such disclosures are pertinent and not inconsistent with the present specification.

Referring now to FIGS. 1 and 2, the apparatus 10 and the method of the present invention for molding and filling a container involves the step of extruding a length of parison 12, in the form of a hollow tube, through the head 14 of an extruder 16 (FIG. 3) and between two coacting first or main mold halves 18 and 20 and two coacting or upper sealing mold halves 22 and 24. The container can be molded using a parison made of a thermoplastic polymer such as low density polyethylene (LDPE), high density polyethylene (HDPE), polypropylene (PP), and the like.

When the parison 12 is of the desired length, the main mold halves 18 and 20 are closed around the lower portion of the length of parison 12 as shown in FIG. 2 and the upper portion of the parison 12 extends out of the mold halves 18 and 20.

Then, the parison 12 is then cut off below the extruder head 14 and above the sealing mold halves 22 and 24 by a vibrating knife 26 (FIG. 3) including a vibrating blade 80 constructed in accordance with the present invention and the upper portion of the cut-off length of the parison tube 12 is held open by a set of vacuum holding or gripping jaws 28 and 30.

Next, and although not shown, a blowing and filling nozzle assembly or device is then moved downwardly into the opening formed in the top of the tubular parison 12 and the container body is formed and filled as described in detail in U.S. Pat. No. 4,707,966 to Weiler et al. which is incorporated herein by reference.

As also described in U.S. Pat. No. 4,707,966 to Weiler et al., when the container is filled with the desired amount of liquid, the blowing and filling nozzle assembly is retracted from the opening in the top of the cut-off parison. At this point in the cycle, the length of parison between the top of the main mold halves 18 and 20 and the holding jaws 28 and 30 is still soft or semi-molten. The coacting second or upper sealing mold halves 22 and 24 are then moved together around the exposed length of parison to form the container upper portion immediately above the container main mold halves 18 and 20 and below the holding jaws 28 and 30.

After the container is sealed at the top, the container main mold halves 18 and 20 and the separate upper sealing mold halves 22 and 24 open, along with the parison holding jaws 28 and 30. The finished container, completely formed, filled, and sealed, is then conveyed out of the apparatus 10 by conventional techniques.

Figure 4:
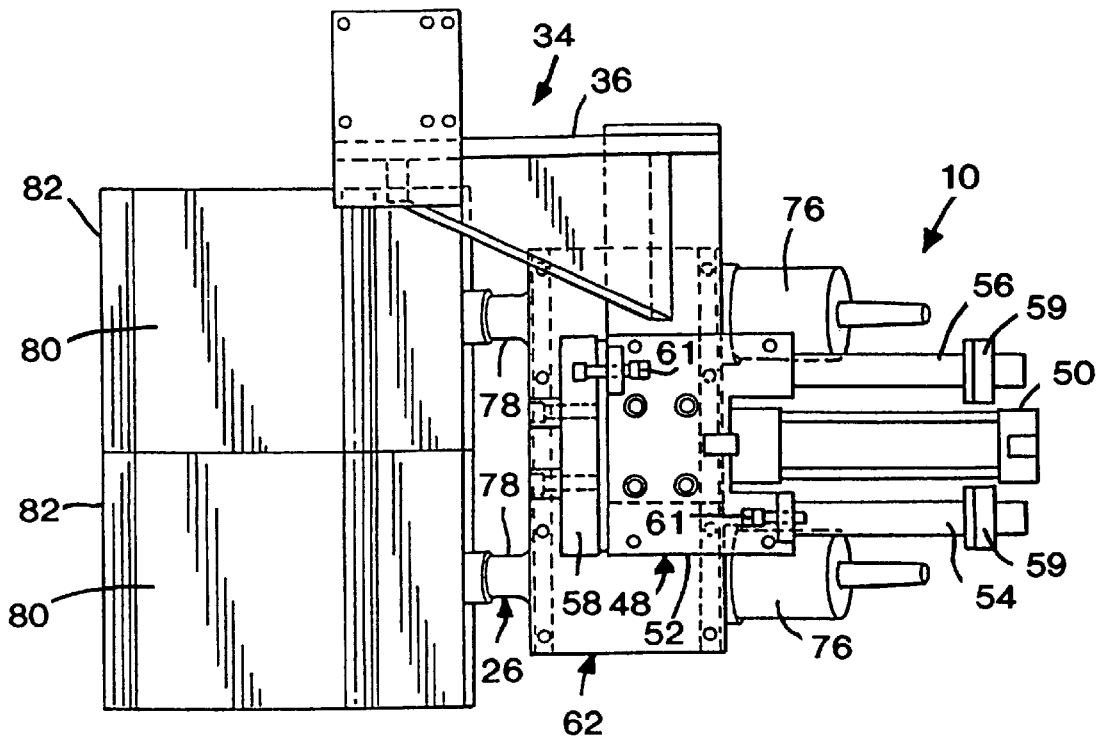
FIG. 4 is a top plan view of the apparatus of FIG. 3.
Figure 5:
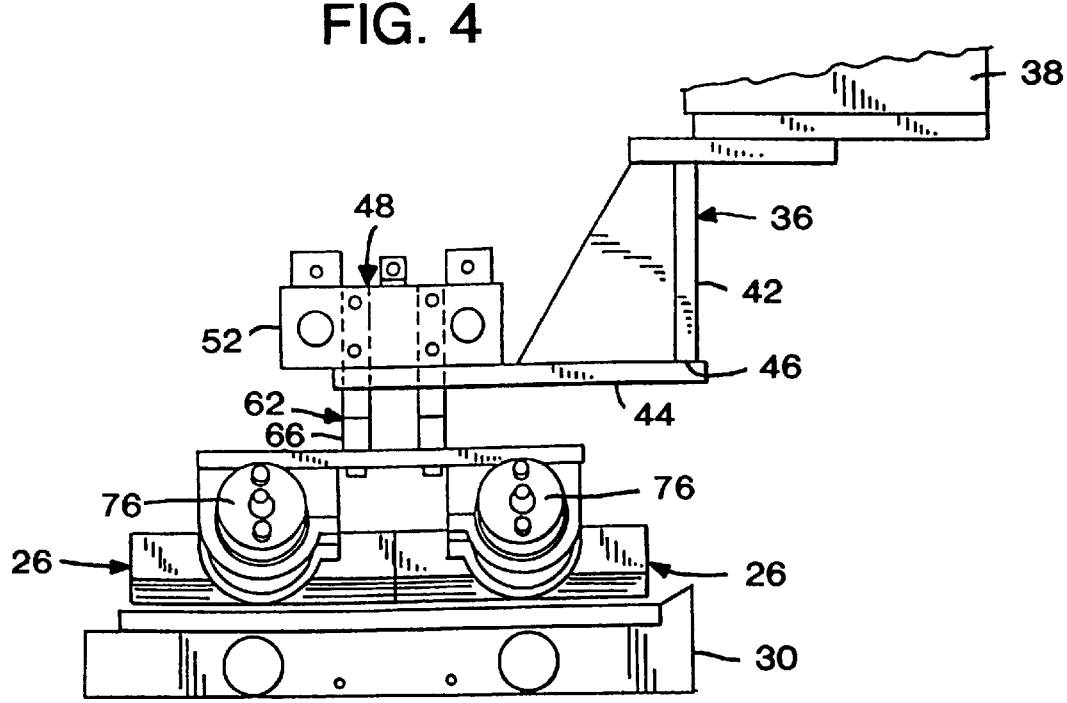
FIG. 5 is a fragmentary side elevational view of the apparatus of FIG. 3.

The vibrating knife 26 of the present invention and its associated carriage assembly 34 are shown in more detail in FIGS. 3–5.

As shown therein, the carriage assembly 34 is positioned adjacent the extruder 16 and includes a support bracket 36 mounted to and extending angularly downwardly from a top, generally horizontal frame structure 38 on the apparatus 10. Particularly, the bracket 36 includes two spaced apart, elongate bars 40 and 42 (FIG. 3) extending angularly downwardly from the top frame 38 in a direction away from the extruder 16. The bracket 36 also includes an actuator mounting plate 44 extending generally normally and horizontally outwardly from the lower face of the distal end 46 (FIG. 5) of the bars 40 and 42.

A pneumatically or hydraulically operated actuator assembly 48, including an actuator 50 and an actuator slide assembly 52, is seated on and mounted to the top of the plate 44. The actuator slide assembly 52 includes two spaced apart, parallel and elongate shafts 54 and 56 which are operably associated with the actuator 50 for longitudinal hydraulically or pneumatically controlled movement relative to the actuator 50 toward and away from the extruder 16. The slide assembly 52 also includes a block 58 at the front thereof which is secured to and connects the proximal ends of the shafts 54 and 56 respectively.

Proximity switch sensor mounts 59 are secured to the top of the block 58 and the distal end of the shaft 54 respectively and are operatively associated with proximity switches 61 mounted to the top, and at the opposite corners, of the slide assembly 52 for controlling the longitudinal movement of the shafts 54 and 56 relative to the actuator 50.

The carriage assembly 34 also includes a generally L-shaped hanger bracket 62 having a generally vertically oriented arm 64 secured to, and extending downwardly from, the outer face of the block 58 and a unitary generally horizontal arm 66 extending generally normally and rearwardly from the lower end of the arm 64.

The embodiment of the apparatus 10 depicted in FIG. 3 includes spaced-apart parallel knives 26 for severing parisons extruded from spaced-apart extruder heads (not shown). It is understood, of course, that the assembly 32 could likewise include only one knife 26 or more than two knives 26.

Each of the knives 26 is mounted to, and hangs angularly downwardly from, the lower face of the arm 66 in the direction of the extruder 16. Each of the knives 26 is preferably an ultrasonic knife which includes a booster 68 and an ultrasonic generator 76 located aft of the booster 68. The carriage assembly 34 includes a booster clamp 70 and a generator clamp 72 which surround the booster 68 and the generator 76 respectively and are mounted to a generator mounting subplate 74 which, in turn, is secured to the lower face of the horizontal arm 66. Preferably, the clamps 70 and 72 are positioned at the nodal points of the booster 68 and the generator 76 respectively to minimize damping of vibrations to the knife 26 during operation.

Each of the knives 26 further includes a horn 78 unitary with and located fore of the booster 68 and the booster clamp 70. A generally flat, plate-like knife blade 80 including a sharp leading edge 82 is mounted to the distal end of the horn 78 (FIGS. 3 and 4). The blade 80 extends in the direction of the extruder 16 and, particularly, is positioned below the extruder head 14 and above the gripper jaws 28 and 30.

Each of the blades 80 is a commercially available 20 KiloHertz (KHz) amplitude ultrasonic knife blade. The blade can be made of titanium or aluminum, and can be liquid or air cooled if desired. While ultrasonic frequencies are preferred for the present purposes, a wide range of severing frequencies can be utilized to make the desired length parison segments. Frequencies in the range of about 50 Hertz (Hz) to about 40 KiloHertz (KHz) are suitable. Frequencies in the ultrasonic range of about 15 KiloHertz (KHz) to about 30 KiloHertz (KHz) are more preferred, however.

According to the present invention, the knife 26 is reciprocable, as shown in FIGS. 1–3 between a retracted position and an extended position in response to the longitudinal fore and aft movement of the shafts 54 and 56 relative to the actuator 50. The reciprocal movement allows the positioning of the blade 80 between the extruder head 14 and the gripper jaws 28 and 30 to traverse the path of the parison 12 being extruded from the extruder head 14 and to sever the parison 12.

Unlike the apparatus and method in U.S. Pat. No. 4,707, 966 to Weiler et al. which, as described earlier, discloses the use of an electrically heated wire to melt and sever the parison which increases the risk of parison particulate contamination, the vibrating knife of the present invention severs the parison 12 without the risk of any particulate generation or contamination.

Figure 6:
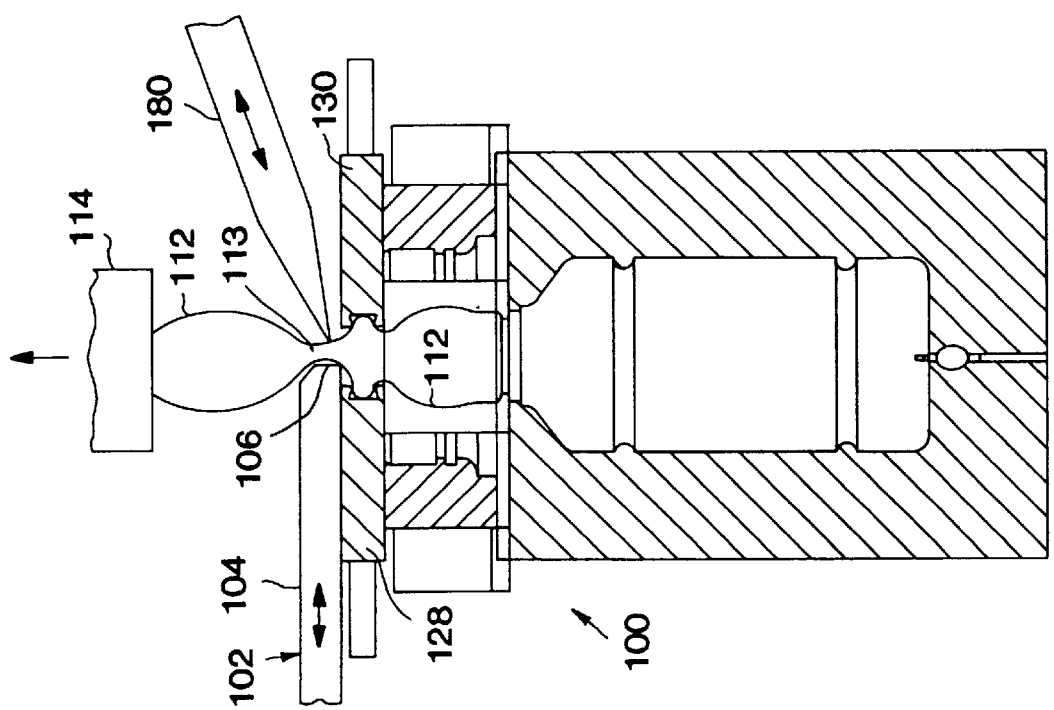
FIG. 6 is a simplified, partly fragmentary sectional view of another embodiment of the apparatus of the present invention which additionally includes an anvil.

FIG. 6 depicts another embodiment of the present invention, generally designated apparatus 100, which is similar to the apparatus 10 except that it additionally includes an anvil 102 in the form of an elongate bar 104 with a flat outer vertical face 106. The anvil 102 is mounted below and adjacent to the extruder head 114 and above and generally parallel to the gripper jaws 128 and 130.

The anvil 102 and an ultrasonic knife (not shown) including a blade 180, similar in structure and operation to the blade 80 of knife 26, are located generally opposite each other on opposite sides of the extruded parison 112 and the anvil 102 is mounted for reciprocating movement between a retracted position (not shown) and an extended position (FIG. 6). The extruded parison is pressurized and bulges outwardly urging the parison wall against the vibrating blade 180.

Additionally, in this embodiment, the extruder head 114 is adapted for vertical upward movement away from the grasping jaws 128 and 130 in the direction of the arrow in FIG. 6 for stretching the sides of the tubular parison 112 to form a stretched, vertically oriented parison segment 113. Opposing walls of parison segment 113 are held apart during severing by ballooning gas introduced into tubular parison 112 in a known manner. If desired, a pair of support jaws similar to support jaws 304 and 306 shown in FIG. 8 can be provided above anvil 102 and blade 180 for holding open parison segment 113.

According to this embodiment, the method for severing the parison 112 with the blade 180 involves, among other steps, the steps of grasping the parison 112 with the jaws 128 and 130 respectively, then lifting the extruder head 114 upwardly to stretch the parison 112 as described above to form the stretched parison segment 113. Next, the anvil 102 is extended into reciprocating and abutting contact with the one side of the flattened parison segment 113 and then the blade 180 is reciprocated into contact with the other side of the stretched parison segment 113 to sever the parison 112.

According to the invention, the anvil 102 and, more specifically, anvil face 106 thereof acts as a backing plate which supports the parison 112 in applications where the blade 180 is used to sever parison 112 made of a thermoplastic polymer of increased elasticity such as, for example, parison made of polypropylene. The anvil 102 addresses the difficulties inherent in severing materials of increased elasticity by advantageously maintaining the parison 112 in a stretched vertical orientation during the severing operation and by preventing the rearward bubbling or stretching of the parison 112 in response to the contact thereof by the vibrating blade 180.

Figure 7:
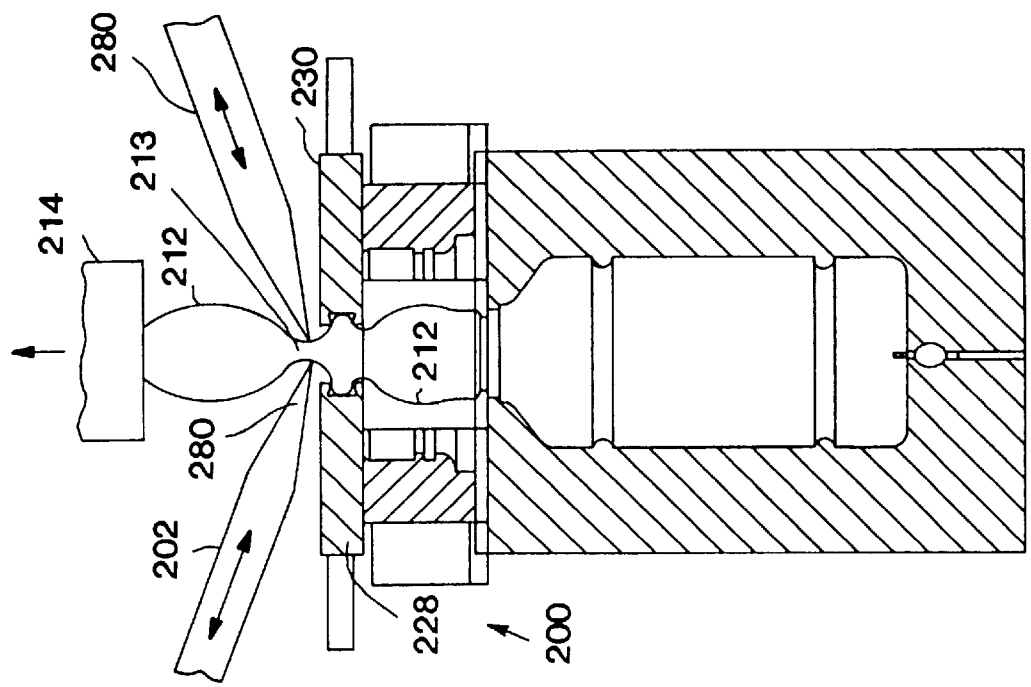
FIG. 7 is a simplified, partly fragmentary sectional view of yet another embodiment of the apparatus of the present invention which additionally includes a second vibrating knife blade.

FIG. 7 depicts yet another embodiment of the present invention, generally designated apparatus 200, which is similar in structure to the apparatus 10 and 100 except that the anvil 102 in FIG. 6 has been substituted with a second vibrating knife (not shown) including a blade 202.

The blades 202 and 280 are essentially mirror images of each other and are offset but positioned generally opposite each other on opposite sides of the parison 212. Although not shown, it is understood that, like the blade 80 of knife 26, the knives including the blades 202 and 280 include carriage assemblies similar to the carriage assembly 34 described above with respect to the knife 26 (not shown) for reciprocating movement in a manner similar to that described with respect to the knife 26 for severing the parison 212. Blades 202 and 280 are offset relative to one another in order to avoid interference when in use.

The apparatus 200, like the apparatus 100, also includes an extruder head 214 which is reciprocable upwardly away from the jaws 228 and 230 to stretch and thin the sides of the tubular parison 212 prior to severing. The stretched sides in parison segment 213 are spaced apart while being severed because of ballooning gas introduced into parison 212.

After a portion of the parison 212 has been stretched as described above, the blades 202 and 280 are brought into abutting contact with the stretched portion of the parison segment 213 to sever the parison 212. The use of two opposed knives including blades 202 and 280 reduces the time required to sever the parison 212.

Figure 8:
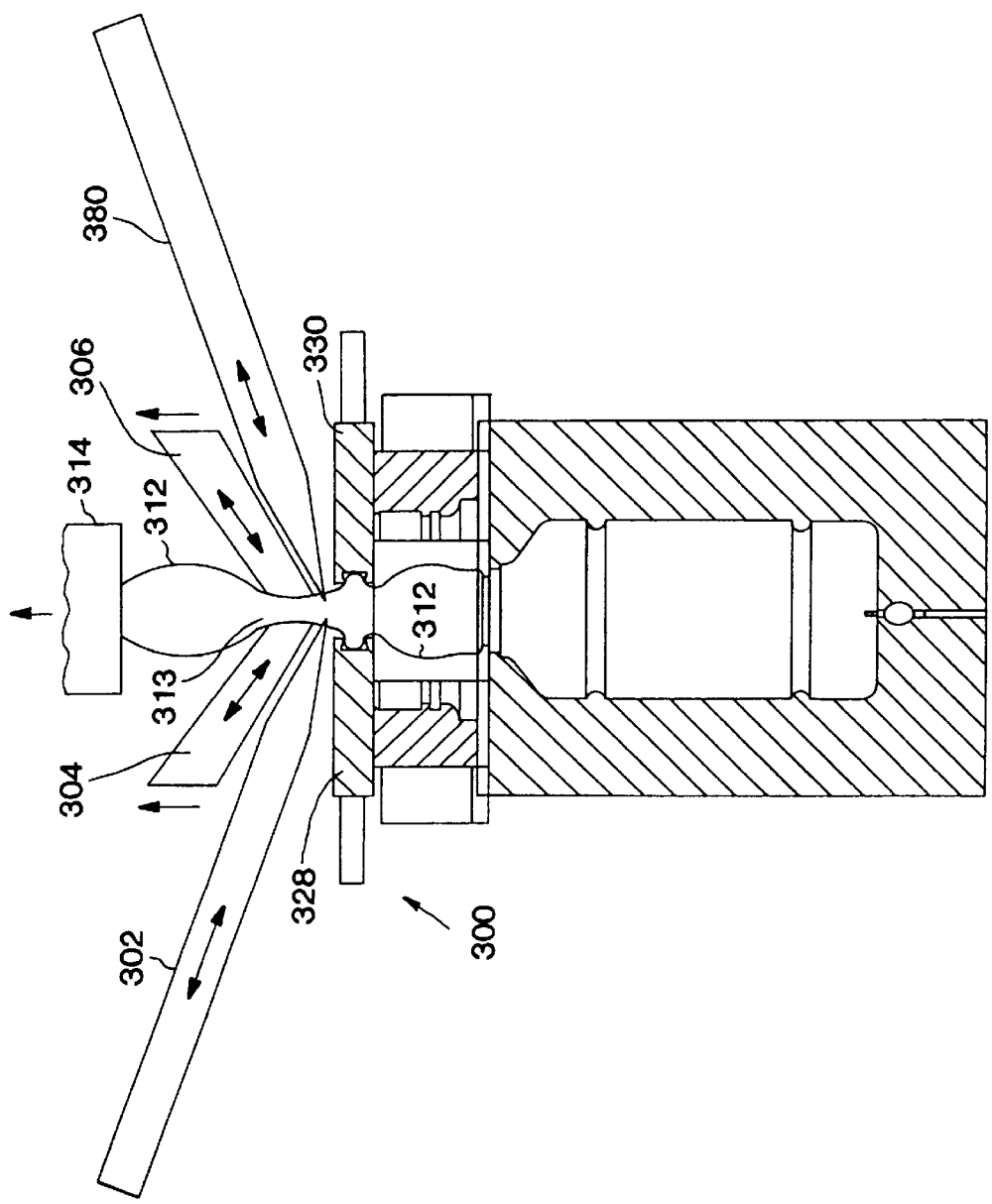
FIG. 8 is a simplified, partly fragmentary sectional view of the apparatus of the present invention which additionally includes a second vibrating knife blade and support jaws.

FIG. 8 depicts a further embodiment of the invention, generally designated apparatus 300, which is similar in structure to the apparatus 200 except that it additionally includes a pair of co-linearly aligned support jaws 304 and 306 on opposite sides of the parison 312. Particularly, the support jaws 304 and 306 are positioned above opposed, offset knives (not shown) including blades 302 and 380 respectively and below the extruder head 314 and are mounted for reciprocal movement between a retracted position (not shown) and an extended position (shown in FIG. 8) where the support jaws 304 and 306 are brought into abutting relationship with the respective sides of the stretched vertical segment 313 of the parison 312. Jaws 304 and 306 do not pinch closed the vertical segment 313. If desired, vacuum passages can be provided in support jaws 304 and 306 to maintain parison 312 open during the severing operation.

According to this embodiment of the invention, the method of severing the parison 312 includes the steps of grasping the parison 312 with the grasping jaws 328 and 330, subsequently lifting the extruder head 314 as well as jaws 304 and 306 upwardly to stretch and thin the parison 312 while holding the parison segment 313 between the jaws 304 and 306, and then severing the parison 312 using the blades 302 and 380.

According to the invention, the pinch jaws 304 and 306 advantageously keep the parison segment 313 in a taut and vertical orientation between the respective jaws 304 and 306 and the holding jaws 328 and 330, thereby improving the efficiency with which the knives and the blades 302 and 380 sever the parison 312. The support jaws 304 and 306 are particularly useful in applications as described above where the parison 312 is made of a polypropylene or the like material of increased elasticity.

Figure 9:
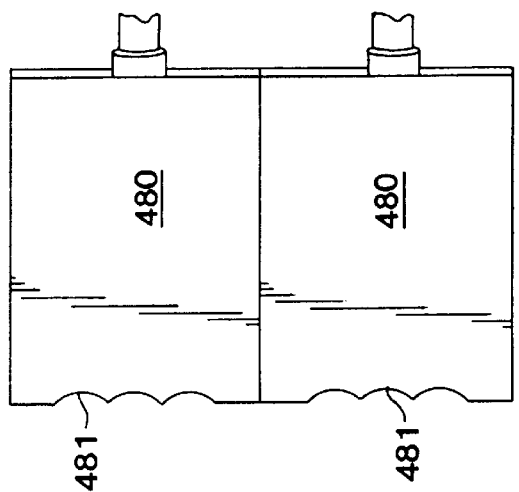
FIG. 9 is a plan view of an alternate vibrating blade configuration which includes a scalloped cutting edge.

FIG. 9 illustrates an alternate vibrating knife arrangement where blades 480 are provided with scalloped cutting edges 481.

From the foregoing, it will be observed that numerous variations and modifications may be effected without departing from the true spirit and scope of the novel concept of the invention. It is to be understood that no limitation with respect to the specific apparatus illustrated herein is intended or should be inferred. Molding apparatus as well as blow-fill-seal apparatus can advantageously utilize the features of the present invention. It is, of course, intended to cover by the appended claims all such modifications as fall within the scope of the claims such as, for example, a modification where the blade 80 includes sharp side edges, contoured or profiled blades that surround the parison in part, and the like. Moreover, the knife 26 is operable in a side-to-side movement relative to and below the extruder head and the blade 80 traverses the path of the extruded parison and severs the same when the knife is moved from one side of the extruder head to the other for severing the parison.

I claim:

1. In an apparatus for molding a container from an extruded length of parison, said apparatus having an extruder with at least one extruder head from which a length of parison is extruded, a mold assembly for closing around the extruded length of parison to mold the container, the improvement comprising a vibrating knife movably mounted between the extruder head and the mold assembly, and having a blade positioned below the extruder head so as to traverse the path of extruded parison when the knife is moved from one side of the extruder head into contact with the extruded length of parison to sever the extruded length of parison a carriage assembly for said vibrating knife including:

a support bracket mounted to said apparatus;

an actuator assembly mounted to said bracket including an actuator and an actuator slide movable longitudinally relative to said actuator;

a hanger bracket mounted to and extending downwardly from said actuator slide, said vibrating knife being movably mounted to said hanger bracket for reciprocating movement in response to the longitudinal movement of said actuator slide relative to said actuator between a retracted position on one side of the extruder head and an extended position wherein said blade of said vibrating knife traverses the path of extruded parison to sever the extruded length of parison;

said vibrating knife is an ultrasonic knife and includes a booster and an ultrasonic generator, said carriage assembly further including spaced apart clamps surrounding said booster and said ultrasonic generator respectively and secured to said hanger bracket.

2. The apparatus of claim 1 wherein said ultrasonic knife has nodal points and said carriage assembly includes clamps surrounding said knife at said nodal points of said booster and said ultrasonic generator respectively and secured to said hanger bracket.

3. The apparatus of claim 1 wherein the blade of said vibrating knife is angularly disposed relative to said path of extruded parison.

4. The apparatus of claim 1 wherein said vibrating knife is angularly disposed relative to said hanger bracket.

5. The apparatus of claim 1 wherein the extruder head is mounted for upward movement relative to the mold assembly for stretching the extruded length of parison.

6. The apparatus of claim 1 further including support jaws on opposite sides of the extruded length of parison and mounted for reciprocating movement between a retracted position and an extended position where said support jaws engage and hold said extruded length of parison.

7. The apparatus of claim 6 wherein said support jaws are mounted between the extruder head and said vibrating knife.

8. The apparatus of claim 1 further including a second vibrating knife opposite said vibrating knife and on the opposite side of the extruded length of parison, the second vibrating knife being mounted for movement adjacent to the extruder head and having a blade thereof positioned opposite but offset relative to said blade of said vibrating knife so as to traverse and sever the extruded length of parison.

9. The apparatus of claim 1 wherein the blade of the ultrasonic knife is vibrated at a frequency in the range of about 15 KHz to about 30 KHz.

10. The apparatus of claim 1 wherein the blade of the ultrasonic knife is vibrated at a frequency of about 20 KHz.

* * * * *